Patented Jan. 14, 1941

2,229,010

UNITED STATES PATENT OFFICE 2,229,010

DIALKENYL-DIHYDROXY-DIPHENYLS

Edgar C. Britton and John E. Livak, Midland, Mich., assignors to The Dow Chemical Company, Midland, Mich., a corporation of Michigan No Drawing. Application June 23, 1939,
Serial No. 280,845

7 Claims. (Cl. 260—620)

This invention relates to certain new alkenyl-substituted-dihydroxy-diphenyl compounds and in particular concerns dialkenyl-dihydroxy-diphenyls having the general formula

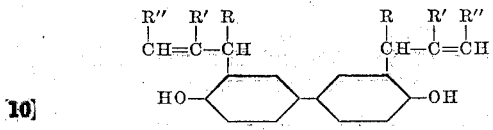

wherein R represents hydrogen, lower alkyl, or phenyl, R' represents hydrogen, chlorine, bromine, or lower alkyl, and R" represents hydrogen or lower alkyl. Examples of such compounds are 3,3'-di-allyl-4,4'-dihydroxy-diphenyl, 3,3'-di-(2-methallyl)-4,4'-dihydroxy-diphenyl, 3,3'-di(2-bromoallyl)-4,4'-dihydroxy-diphenyl, 3,3'-di-(3-propylallyl)-4,4'-dihydroxy-diphenyl, 3,3'-di-(1-phenylallyl)-4,4'-dihydroxy-diphenyl, 3,3'-di-(1-ethylallyl)-4,4'-dihydroxy-diphenyl, etc.

The dialkenyl-dihydroxy-diphenyls having the above general formula are usually obtained in the form of white crystalline solids which are insoluble in water but are soluble in the common organic solvents, e. g. acetone, ethanol, petroleum ether, carbon tetrachloride, benzene, etc. They are useful as intermediates in the preparation of dyes and dye intermediates, plasticizers, wetting agents, pharmaceuticals, toxicants, etc. They are color sensitive to oxidizing agents and are hence useful as indicators.

The new 3,3'-dialkenyl-4,4'-dihydroxy-diphenyl compounds are usually prepared by the molecular rearrangement of the allyl-type ethers of 4,4'-dihydroxy-diphenyl, e. g. 4,4'-di-allyloxy-diphenyl, 4,4'-di-(2-ethylallyloxy)-diphenyl, 4,4'-di-crotyloxy-diphenyl, 4,4'-di-(2-chloroallyloxy)-diphenyl, etc. As disclosed in our co-pending application, Serial No. 280,844, filed June 23, 1939, these ethers are conveniently prepared by reacting an allyl-type halide with an alkali-metal salt of 4,4'-dihydroxy-diphenyl. The rearrangement of such ethers takes place according to the equation

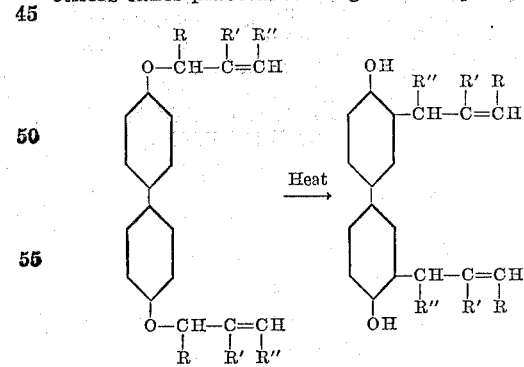

It will be noted from the equation that the gamma carbon atom of the allylic side-chain becomes linked to the aromatic nucleus with simultaneous shifting of the double bond so that the allylic structure of the side chain is maintained. Thus, 4,4'-di-crotyloxy-diphenyl rearranges to form 3,3'-di-(1-methylallyl)-4,4'-dihydroxy-diphenyl, 4,4'-di-cinnamyloxy-diphenyl rearranges to form 3,3'-di-(1-phenylallyl)-4,4'-dihydroxy-diphenyl, etc. Certain of the new compounds may also be prepared by the direct alkenylation of 4,4'-dihydroxy-diphenyl, but we prefer to employ the rearrangement reaction just described because of its efficiency and ease of operation.

The rearrangement is effected simply by heating the ether compound to a temperature above 225° C. but below the decomposition temperature for 15–45 minutes. A particularly convenient mode of operation consists in dissolving the ether in 0.5–1.0 part of an inert high-boiling solvent, such as diethyl aniline, and heating the resultant solution at reflux temperature until the reaction is complete. The reaction product is then dissolved in an aqueous alkali-metal hydroxide, whereby an alkali-metal salt of the dialkenyl-dihydroxy-diphenyl compound is formed, and the diethyl aniline is separated from the mixture by extraction with an organic solvent such as benzene. The aqueous layer of the extract is then acidified with a dilute mineral acid, whereby the free dialkenyl-dihydroxy-diphenyl compound is precipitated, and the latter product is filtered off and dried. If desired, it may be purified by recrystallization from a suitable solvent or solvent mixture.

The following examples illustrate several ways in which the principle of the invention has been applied, but are not to be construed as limiting the same.

Example 1

33.5 grams of 4,4'-di-(2-chloroallyloxy)-diphenyl was dissolved in 18.7 grams of diethyl aniline and the resulting solution was heated at reflux temperature (241°–242° C.) for 30 minutes. The solution was allowed to cool to room temperature and was poured into 400 grams of a 5 per cent sodium hydroxide solution. The diethyl aniline was separated from the alkaline solution by extracting the latter with about 140 grams of benzene, after which time the aqueous layer was acidified. The crude 3,3'-di-(2-chloroallyl)-4,4'-dihydroxy-diphenyl, which was precipitated by the acidification treatment, was filtered off, dried, and was purified by recrystallization from about 400 grams of a mixed solvent consisting of equal parts of benzene and petroleum ether. The recrystallized 3,3'-di-(2-chloroallyl)-4,4'-dihydroxy-diphenyl was a white crystalline solid having a melting point of 121°–123° C.

Example 2

A solution of 14.1 grams of 4,4'-di-crotyloxy-diphenyl in 9.4 grams of diethyl aniline was heated at a temperature of about 245° C. for 30 minutes. The mixture was then cooled and dissolved in about 400 grams of 5 per cent aqueous sodium hydroxide, and the alkaline solution was extracted with about 90 grams of benzene. The aqueous layer of the extract was acidified with dilute hydrochloric acid and the 3,3'-di-(1-methylallyl)-4,4'-dihydroxy-diphenyl which was thereby precipitated was filtered off and dried. After recrystallization from benzene-petroleum ether, the product was a white crystalline solid melting at 79°–80° C.

Example 3

A solution of 38.1 grams of 4,4'-di-allyloxy-diphenyl in 27.1 grams of diethyl aniline was heated at a temperature of about 240°–242° C. for 25 minutes, after which time the mixture was dissolved in about 400 grams of 7 per cent aqueous sodium hydroxide and extracted with benzene. The aqueous layer of the extract was acidified with dilute sulphuric acid and the 3,3'-di-allyl-4,4'-dihydroxy-diphenyl product was separated and purified as in Example 1. The purified compound was a white crystalline solid melting at 80°–81° C.

Example 4

A solution of 28.2 grams of 4,4'-di-(2-methalloxy)-diphenyl in 18.7 grams of diethyl aniline was heated at reflux temperature for 25 minutes, after which time the mixture was dissolved in dilute aqueous sodium hydroxide and the 3,3'-di-(2-methallyl)-4,4'-dihydroxy-diphenyl product was separated as in Example 1. After being purified by two recrystallizations from benzene-petroleum ether, the product was a white crystalline solid having a melting point of 97°–97.5° C.

Other examples of the new 3,3'-dialkenyl-4,4'-dihydroxy-diphenyls of the present class which may be prepared by the rearrangement of a 4,4'-dialkenyloxy-diphenyl compound as herein described include 3,3'-di-(3-ethylallyl)-4,4'-dihydroxy-diphenyl, prepared from 4,4'-di-(1-ethylalloxy)-diphenyl; 3,3'-di-(2-isobutylallyl)-4,4'-dihydroxy-diphenyl from 4,4'-di-(2-isobutylallyloxy)-diphenyl; 3,3'-di-(2-bromoallyl)-4,4'-dihydroxy-diphenyl from 4,4'-di-(2-bromoallyloxy)-diphenyl; 3,3'-di-(1-propylallyl)-4,4'-dihydroxy-diphenyl from 4,4'-di-(3-propylallyloxy)-diphenyl; 3,3'-di-(1,3-dimethylallyl)-4,4'-dihydroxy-diphenyl from 4,4'-di-(1,3-dimethylallyloxy)-diphenyl; etc.

Other modes of applying the principle of our invention may be employed instead of those explained, change being made as regards the method herein disclosed, or the materials employed, provided the product stated by any of the following claims or the equivalent of such stated product be obtained.

We therefore particularly point out and distinctly claim as our invention:

1. A 3,3'-dialkenyl-4,4'-dihydroxy-diphenyl having the general formula

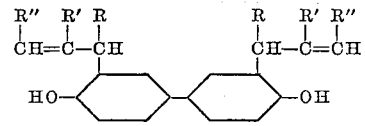

wherein R represents a substituent selected from the class consisting of hydrogen, lower alkyl, and phenyl, R' represents a substituent selected from the class consisting of hydrogen, chlorine, bromine, and lower alkyl, and R" represents a substituent selected from the class consisting of hydrogen and lower alkyl.

2. A 3,3'-di-methallyl-4,4'-dihydroxy-diphenyl having the general formula

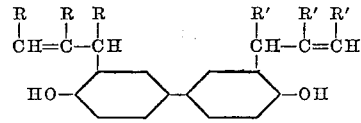

wherein one of the Rs and R's represents a methyl group and the other Rs and R's represent hydrogen.

3. 3,3'-di-allyl-4,4'-dihydroxy-diphenyl, a white crystalline solid melting at approximately 80°–81° C. and having the formula

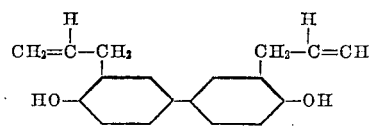

4. 3,3'-di-(1-methylallyl)-4,4'-dihydroxy-diphenyl, a white crystalline solid melting at approximately 79°–80° C. and having the general formula

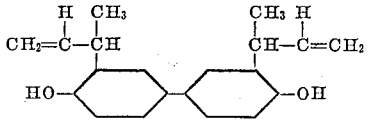

5. 3,3'-di-(2-chloroallyl)-4,4'-dihydroxy-diphenyl, a white crystalline solid melting at approximately 121°–123° C. and having the general formula

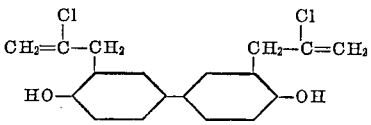

6. A method for preparing a 3,3'-dialkenyl-4,4'-dihydroxy-diphenyl, which comprises heating a 4,4'-dialkenyl-oxy-diphenyl at a temperature above 225° C. but below the decomposition temperature.

7. A method for preparing a 3,3'-dialkenyl-4,4'-dihydroxy-diphenyl, which comprises heating a solution of a 4,4'-dialkenyloxy-diphenyl in diethyl aniline at a temperature above 225° C. but below the decomposition temperature of the mixture.

EDGAR C. BRITTON.
JOHN E. LIVAK.